(12) United States Patent
Liao et al.

(10) Patent No.: US 11,283,595 B1
(45) Date of Patent: Mar. 22, 2022

(54) SYSTEMS AND METHODS FOR SECURING CACHED DATA STORED OFF-CHAIN IN A BLOCKCHAIN-BASED NETWORK

(71) Applicant: Blockstack PBC, New York, NY (US)

(72) Inventors: Yukan Liao, Toronto (CA); Matthew Little, New York, NY (US); Jude Nelson, New Brunswick, NJ (US); Aaron Blankstein, Chicago, IL (US)

(73) Assignee: Hiro Systems PBC, New York, NY (US)

(*) Notice: Subject to any disclaimer, the term of this patent is extended or adjusted under 35 U.S.C. 154(b) by 99 days.

(21) Appl. No.: 16/555,382

(22) Filed: Aug. 29, 2019

(51) Int. Cl.
| | |
|---|---|
| *H04L 9/06* | (2006.01) |
| *G06F 9/451* | (2018.01) |
| *G06F 21/60* | (2013.01) |
| *G06F 16/172* | (2019.01) |
| *H04L 67/1097* | (2022.01) |
| *G06F 16/16* | (2019.01) |

(52) U.S. Cl.
CPC .......... *H04L 9/0637* (2013.01); *G06F 9/451* (2018.02); *G06F 16/166* (2019.01); *G06F 16/172* (2019.01); *G06F 21/602* (2013.01); *H04L 67/1097* (2013.01); *H04L 2209/38* (2013.01)

(58) Field of Classification Search
CPC .............. H04L 9/0637; H04L 67/1097; H04L 2209/38; G06F 9/451; G06F 16/166; G06F 16/172; G06F 21/602
See application file for complete search history.

(56) References Cited

U.S. PATENT DOCUMENTS

| | | | |
|---|---|---|---|
| 10,417,219 B1* | 9/2019 | Yang | H04L 9/0643 |
| 10,425,426 B1* | 9/2019 | Simons | H04L 9/3226 |
| 10,664,451 B1 | 5/2020 | Liao et al. | |
| 2017/0236123 A1 | 8/2017 | Ali et al. | |
| 2018/0302222 A1* | 10/2018 | Agrawal | G06F 21/604 |
| 2019/0073666 A1* | 3/2019 | Ortiz | G06F 16/27 |
| 2019/0132350 A1* | 5/2019 | Smith | G06F 16/2379 |
| 2019/0340136 A1* | 11/2019 | Irwin | G06F 3/0683 |
| 2020/0014527 A1* | 1/2020 | Subramaniam | G06F 21/64 |
| 2020/0036712 A1* | 1/2020 | Soundararajan | H04L 63/0823 |
| 2020/0213329 A1* | 7/2020 | Simons | H04L 9/3226 |
| 2020/0311299 A1* | 10/2020 | Amar | H04L 9/3213 |
| 2020/0313856 A1* | 10/2020 | Basu | G06Q 20/389 |
| 2020/0382277 A1* | 12/2020 | Kong | G06F 21/64 |

(Continued)

OTHER PUBLICATIONS

Ali, Muneeb, Dissertation, Trust-to-Trust Design of a New Internet, dated Jun. 2017.

(Continued)

*Primary Examiner* — Yonas A Bayou
(74) *Attorney, Agent, or Firm* — Knobbe Martens Olson & Bear LLP

(57) ABSTRACT

A storage server communicating with a backend storage provider, such as a cloud-based provider, performs processes for backing up encrypted data in the backend storage in a data cache shared by multiple decentralized applications, to allow a user of a frontend client to revert to a prior version of an encrypted file if that encrypted file has been compromised by one of the decentralized applications, where the storage server performs no encryption of the data and is not exposed to encryption keys.

20 Claims, 7 Drawing Sheets

(56) References Cited

U.S. PATENT DOCUMENTS

2020/0387622 A1* 12/2020 Falk ..................... H04L 9/3239

OTHER PUBLICATIONS

Ali, Muneeb et al., Blockstack: A New Decentralized Internet, dated May 2017.
Ali, Muneeb et al., Blockstack: A New Internet for Decentralized Applications, dated Oct. 2017.
Ali, Muneeb et al., Blockstack: A Global Naming and Storage System Secured by Blockchains. In Proceedings of the 2016 USENIX Annual Technical Conference, Jun. 2016.
Ali, Muneeb et al., Bootstrapping Trust in Distributed Systems with Blockchains. In USENIX ;login 41(3):52-58, Fall 2016.
Ali, Muneeb et al., The Blockstack Decentralized Computing Network, dated May 30, 2019.
Nelson, Jude et al., Extending Existing Blockchains with Virtualchain. In Workshop on Distributed Cryptocurrencies and Consensus Ledgers, 2016.
Nelson, Jude, Dissertation: Wide-Area Software-Defined Storage, dated Jun. 2018.

* cited by examiner

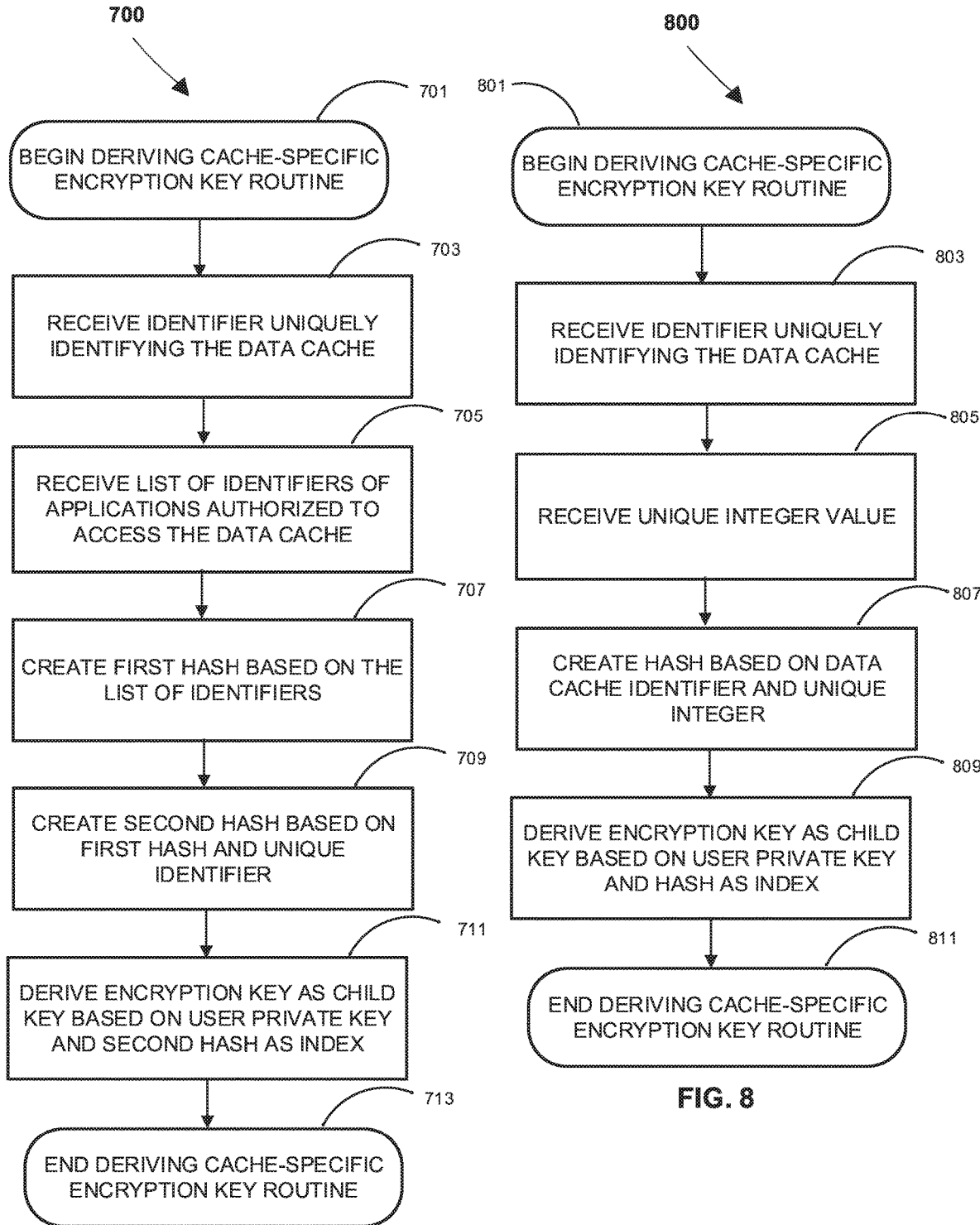

SYSTEMS AND METHODS FOR SECURING CACHED DATA STORED OFF-CHAIN IN A BLOCKCHAIN-BASED NETWORK

BACKGROUND

Field

This disclosure generally relates to networks implementing a blockchain. More specifically, this disclosure relates to off-chain storage of data accessible within the context of a blockchain network.

Description of the Related Art

Blockchain is a distributed digital ledger that allows multiple parties to engage in secure, trusted transactions with one another without an intermediary. The blockchain itself can include a chain of blocks that are linked together cryptographically, with each block in the chain storing one or more transactions and the number of blocks in the chain growing over time. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

Individual blockchain records cannot hold much data, often on the order of single kilobytes. Off-chain backend data storage linked to a blockchain can increase the amount of storage available in the context of a blockchain-based network.

SUMMARY

The systems, methods, and devices described herein each have several aspects, no single one of which is solely responsible for its desirable attributes. Without limiting the scope of this disclosure, several non-limiting features will now be discussed briefly.

Systems and/or computer systems are disclosed that comprise a computer readable storage medium having program instructions embodied thereon, and one or more processors configured to execute the program instructions to cause the one or more processors to perform operations comprising one or more aspects of the above- and/or below-described embodiments (including one or more aspects of the appended claims, which are incorporated in this written description by reference).

Computer-implemented methods are disclosed in which, by one or more processors executing program instructions, one or more aspects of the above-and/or below-described embodiments (including one or more aspects of the appended claims) are implemented and/or performed.

Computer program products comprising a computer readable storage medium are also disclosed, wherein the computer readable storage medium has program instructions embodied thereon the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

Throughout the drawings, reference numbers may be (but are not necessarily) reused to indicate corresponding elements. The drawings are provided to illustrate example embodiments described herein and are not intended to limit the scope of the disclosure.

FIG. 7 provides one alternative of a routine for deriving a cache-specific encryption key.

FIG. 8 provides another alternative of a routine for deriving a cache-specific private key.

DETAILED DESCRIPTION

Blockchain Technology

The following U.S. Patent Applications, filed Aug. 29, 2019, are incorporated by reference in their entireties (including the written description, claims, and drawings) for all that they disclose: U.S. patent application Ser. No. 16/555,445 (entitled SYSTEMS AND METHODS FOR ENCRYPTING DATA IN BACKEND STORAGE CACHES SHARED BY MULTIPLE DECENTRALIZED APPLICATIONS); U.S. patent application Ser. No. 16/555,677 (entitled PLATFORM AND ASSOCIATED METHOD FOR AUTHENTICATING THE IDENTITY OF A USER IN A DECENTRALIZED SYSTEM WITHOUT NEED FOR A THIRD-PARTY IDENTITY SERVICE); U.S. patent application Ser. No. 16/555,533 (entitled CLIENT-SIDE AUTHENTICATION SYSTEM AND ASSOCIATED METHOD); U.S. patent application Ser. No. 16/555,513 (entitled SYSTEM AND METHOD FOR REGISTERING INSTANTANEOUSLY CONFIRMABLE IDENTIFIER IN A BLOCKCHAIN-BASED DOMAIN NAME SYSTEM).

Blockchains are decentralized digital ledgers that record information distributed among a network of computers. The decentralized digital ledgers ensure each computer has identical records. Blockchain technologies consist of three fundamental components: cryptographically linked data structures, networking, and consensus protocols.

Figure 1:
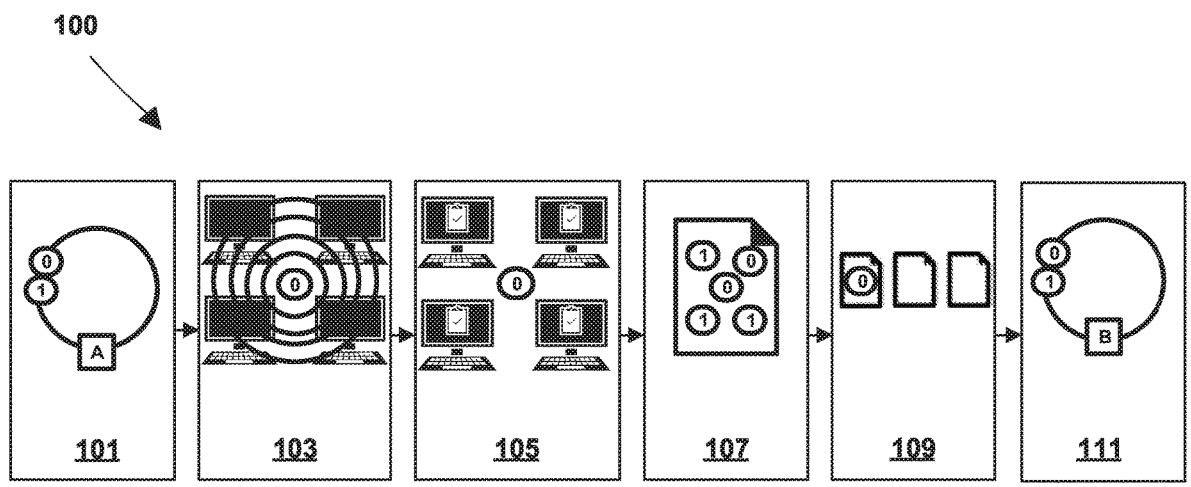
FIG. 1 provides an overview of a blockchain network.

First, a blockchain consists of a series of digital "blocks" that are securely linked together in sequential order using cryptography to create a virtual chain of data. These blocks record information such as financial transactions, agreements between parties, and ownership records, as shown in FIG. 1, which provides an overview of a blockchain network 100. In block 101 of FIG. 1, a transaction to transfer a digital coin from user A to user B is initiated by user A. In block 103, the transaction is broadcast to every node in the network. In block 105, the nodes form a consensus on whether the transaction is valid. In block 107, the nodes add valid transactions to a "block." In step 109, the block is added to the blockchain. In step 111, the transaction is complete and the digital coin transfers to user B (e.g., user B).

Second, a blockchain runs on a distributed network of computers. Computers in the network, also referred to as nodes, store copies of the blockchain, validate that the blockchain has not been tampered with, and verify when transactions can be added to a new block. Nodes share and synchronize all updates. To be clear, a node does not need to represent a distinct machine. Multiple nodes can run on the same machine (e.g., one node per core).

Finally, blockchains maintain agreement between participants using a "consensus protocol"—a set of rules that allows nodes to determine when to add new information to the blockchain. Consensus protocols are designed to make the blockchain resistant to tampering and ensure consistency in the data among all participants in the network.

In general, a blockchain is a global append-only log. Writes to the global append-only log are called transactions, and transactions are organized into blocks. Thus, each block can include or package a single transaction or multiple transactions. Writing to the global append-only log (e.g., writing to a block) requires a payment in the form of a transaction fee.

Decentralized Platform

In at least one embodiment, a blockchain network serves as the base of a stack in a decentralized software platform. This blockchain network will be referred to as the base blockchain. The base blockchain can be a public (permissionless) network, in which anyone can join the network, or a private (permissioned) network, which places restrictions on who may participate in the network and in which transactions. The base blockchain can also be a virtual blockchain. A virtual blockchain is a layer that resides on top of a public or private blockchain network. The nodes of the underlying blockchain network are not aware of the presence of virtual blockchains. New operations are defined in the virtual blockchain layer and are encoded in the metadata of valid blockchain transactions. Accordingly, the underlying blockchain nodes receive and store information about the virtual blockchain transactions, but the logic for processing the virtual blockchain transaction only exists at the virtual blockchain level.

Suitable base blockchain networks include Bitcoin, Ethereum, and the STACKS™ blockchain (Blockstack PBC, New York City, N.Y., USA). Preferably, the base blockchain enables users to register and control digital assets like usernames and register/execute smart contracts.

Such a platform can be implemented, for example, for supporting decentralized applications or "DApps." A DApp is different from a traditional world-wide-web-based or other client-server-based application. In this context of this disclosure, DApp is a broad term and includes executable applications and websites that do not require a centralized server to store user information for users of the executable application or website. An example of a DApp is a decentralized microblogging platform, akin to the TWITTER online news and social networking service (Twitter, Inc., San Francisco, Calif., USA), in which users post or interact with short messages. Unlike a centralized system, once a user publishes a message with the microblogging DApp, the message cannot be erased by anyone except the user, including by the company that created the DApp. This is because the DApp provider does not have centralized control over the user's (or any other user's) messages.

In certain embodiments, the blockchain stores information about the user which can be used to authenticate the user. After logging in to the platform with a username, a user can use the same username to interact with multiple DApps on the platform, irrespective of which entity created or maintains the DApp. For example, after logging in with a username, a user can use the same username for buying books online from one entity's DApp ("App1") and to post on social media provided by a different entity's DApp ("App2"). The creator/administrator of the platform can be different from both the creators/administrators of App1 and App2.

Off-Chain Data Storage

Individual blockchain transactions cannot hold much data, often on the order of single-digit kilobytes or less, depending on the base blockchain. Off-chain backend data storage linked to a blockchain can increase the amount of storage available to DApps to multiple terabytes, petabytes, or greater. Aspects of an example implementation of such an off-chain storage system are described in U.S. Patent Application Publication No. 2017/0236123 to Ali et al., the disclosure of which is incorporated by reference in its entirety, including the description of the external data storage units in paragraphs 66-75 and FIG. 2.

By implementing off-chain backend data storage, a platform can be beneficially structured such that a user exiting a DApp leaves no data under the DApp's or platform's control because none was stored with the DApp or with the platform creator/administrator. Personal information and data are encrypted and remain under the control of the user.

Figure 2:
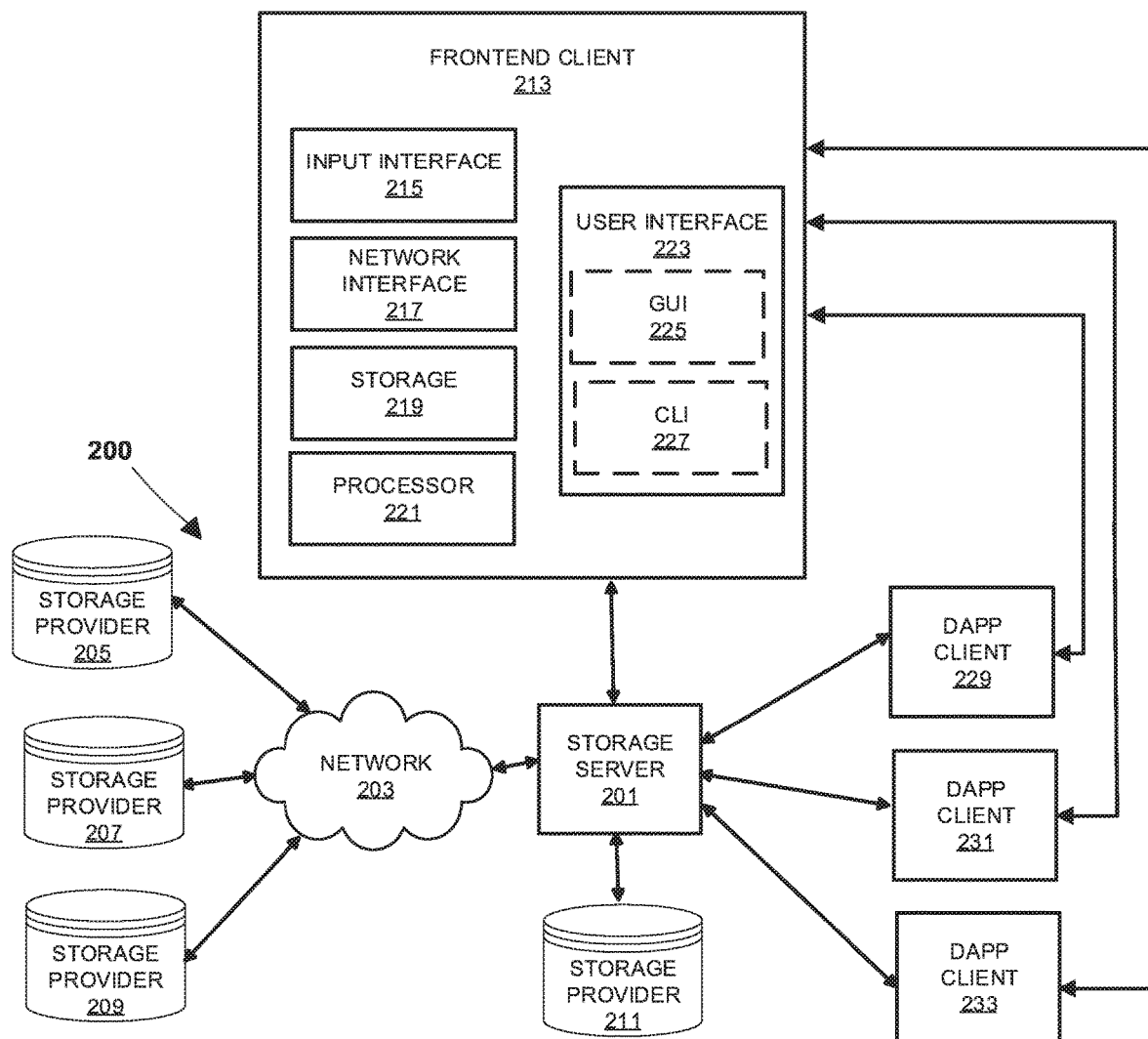
FIG. 2 is a block diagram of an illustrative operative environment in which off-chain decentralized storage is implemented in a blockchain-based network.

FIG. 2 of the present disclosure shows a block diagram of an illustrative operative environment 200 in which off-chain decentralized storage is implemented in a blockchain-based network.

The decentralized storage is embodied in arbitrary backend storage providers 205-211. A backend storage provider 205-211 can be, without limitation, a cloud storage provider, a local disk, or remote storage. Suitable backend storage providers include Amazon S3 (Amazon Web Services, Inc., Seattle, Wash., USA), Google Cloud storage and Google Drive (both by Google LLC, Mountain View, Calif., USA), Dropbox (Dropbox, Inc., San Francisco, Calif., USA), Microsoft Azure (Microsoft Corp., Redmond, Wash., USA), FreeNAS Server (iXsystems, Inc., San Jose, Calif.), FTP, network storage, and local storage. In FIG. 2, for example, storage providers 205 and 207 represent cloud storage, storage provider 209 represents network storage, and storage provider 211 represents 211. The storage server 201 communicates with each storage provider 205-211 via a distinct network connection.

In FIG. 2, the environment 200 further includes a storage server 201 that interfaces with these arbitrary backend storage providers 205-211 either directly (e.g., with storage provider 211) or via a network 203 and exposes a consistent interface to DApp clients 229-233 for storing data to and reading data from these storage providers 205-211. The storage server can be hosted by a third-party provider or by a user of the frontend client 213 discussed below. In at least one embodiment, the storage server 201 writes data as it is provided to it from DApp clients 229-233. The storage server 201 may not offer guarantees about the written data. For example, it may not ensure that the data is validly formatted, contains valid signatures, or is encrypted. These guarantees can be provided by frontend client libraries, discussed later in this disclosure.

The storage server 201 also interfaces with one or more frontend clients 213. A frontend client 213 is a computing device that can allow a user to manage storage of the user's profile and application data and find and launch DApps. A frontend client 213 includes one or more input interfaces 215, one or moFe network interfaces 217, a local storage 219, and a processor 221. The user interface 215 is configured to receive data, including private key data sufficient to identify a parent private key of a user. For example, the private key data can represent a 12-24 word mnemonic or the parent private key itself. The one or more network interfaces 217 are configured to couple the frontend client 213 to the storage server 201 and the DApp clients 229-233. The frontend client 213 also includes a user interface 223 capable of displaying a graphical user interface 225, a command line interface 227, or both. The local storage 219 (including a non-transitory computer readable storage medium storing program instructions) and the hardware processor 221 function together such that the hardware processor 221 executes the program instructions stored by the local storage 219, which causes the frontend client 213 to perform certain actions.

Although FIG. 2 shows one frontend client 213, it should be understood that, in practice, multiple frontend clients can interact with the storage server 201. As shown next in FIG. 3, the environment 200 of FIG. 2 is structured such that user A 301 (associated with one frontend client) and user B (associated with a different frontend client) each has access to the user's selected storage provider, without necessarily having access to each other's storage provider. Here, for example, user A 301 has access to storage provider 207 (through the storage server 201 of FIG. 2) and user B 303 has access to storage provider 205 (through the storage server 201 of FIG. 2). But user A 301 does not have access to the storage provider 205 of user B 303; and user B 303 does not have access to the storage provider 207 of user A 301. If user A 301 and user B 303 coincidentally choose the same storage provider, the common storage providers are accessed via distinct network connections via the storage server 201 (FIG. 2) such that user A 301 and user B 303 does not have access to each other's data.

Within a storage provider (such as storage provider 205), multiple DApps associated with a user can write data to and read data from a common data cache on the backend storage provider of the user's choosing, if the DApps are authorized to do so. Data cache is a broad term and includes a user-controlled location, such as a directory or partition or logical or virtual storage, capable of storing data such that multiple DApps can read and write to the location. A data cache is specific to a user, but accessible by multiple authorized DApps. A DApp can request authorization to access the data cache. A user can grant and revoke that authorization from the user interface 223 of their respective frontend client 213.

Referring again to FIG. 2, user A 301 (of FIG. 3), and potentially other users, has access to DApp clients 229-233 (of FIG. 2). For sake of this example explanation, DApp client 229 is associated with a messaging DApp (DApp 229), DApp client 231 is associated with a photo DApp (DApp 231), and DApp client 233 is associated with a password-management DApp (DApp 233). In the example of FIG. 4, DApp 229 and DApp 231 are authorized to access a photo data cache (data cache 401) on user A's selected backend storage provider 205. DApp 229 is authorized to a contacts data cache (data cache 403), but DApp 231 is not authorized to access data cache 403. User A is additionally associated with DApp 233, but DApp 233 is not authorized to read from or write to data cache 401 or data cache 403. In this way, a user's data cache is only accessible for reads and writes by its associated DApps; unauthorized DApps cannot access the data cache.

Figure 3:
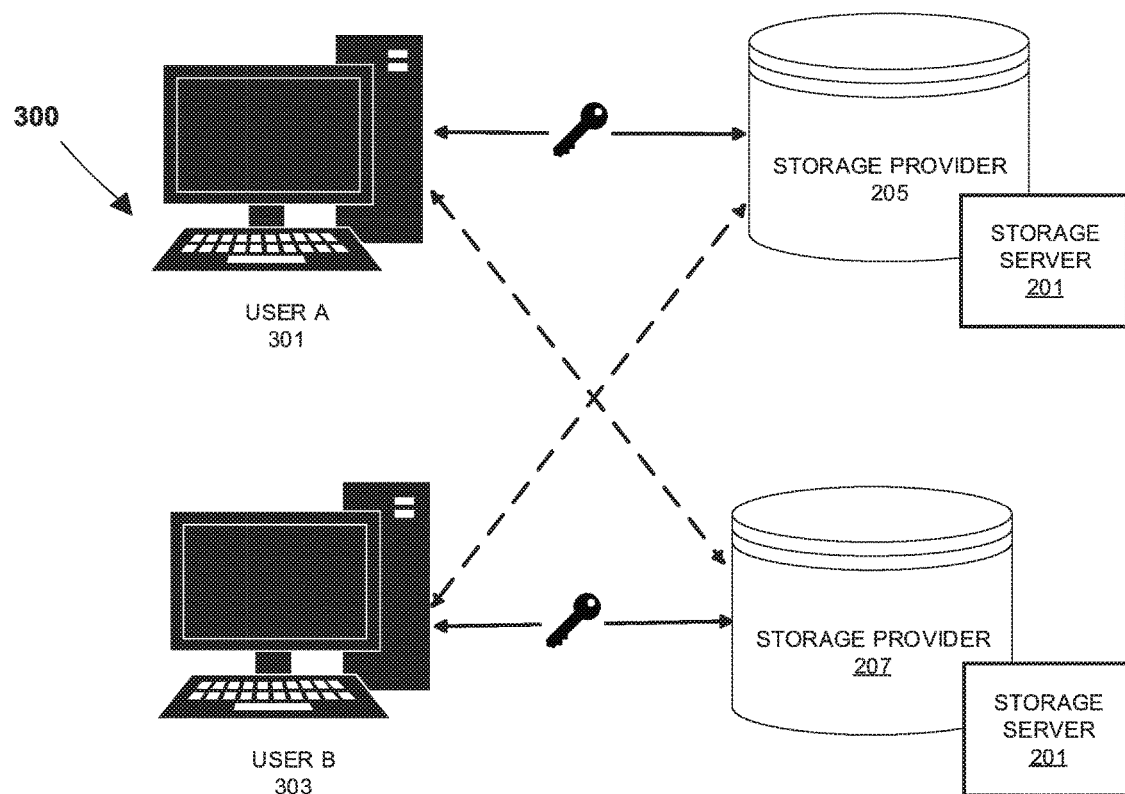
FIG. 3 is a block diagram showing an illustrative relationship between users and off-chain storage providers.
Figure 4:
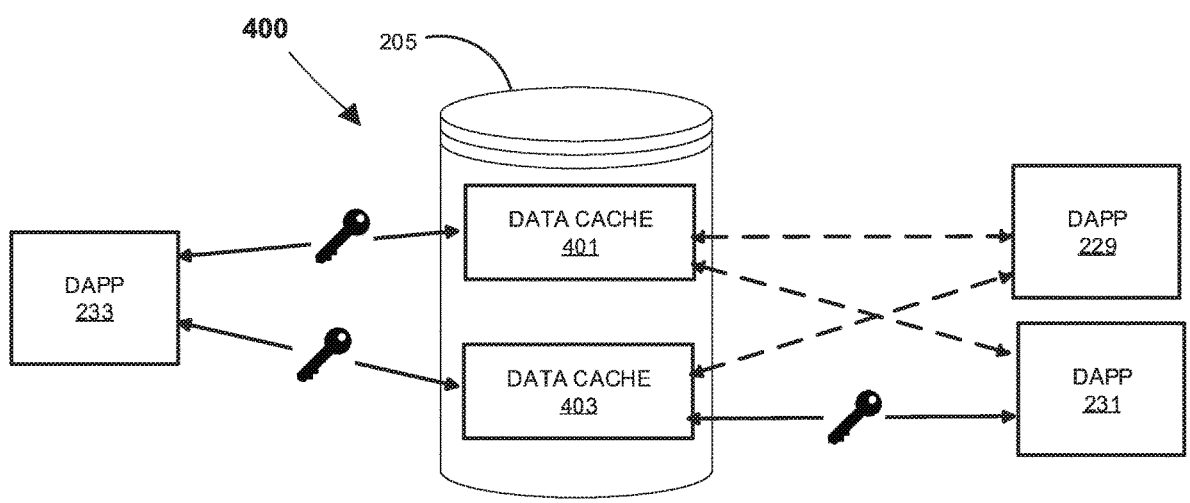
FIG. 4 is a block diagram showing an illustrative relationship between decentralized applications and data caches on an off-chain storage provider.

To summarize FIGS. 2-4, the storage server 201 (FIG. 2) is executed by a third-party provider or by user A 301 (FIG. 2). The storage server 201 is programmed to store data to a backend storage provider (any of storage providers 205-211). With frontend client 213, user A 301 logs into the storage server 201 and then, with this username, can access DApps via DApp clients 229-233. When user A 301 uses the username to access DApp client 229 or DApp client 231, reads and writes from these DApp clients 229, 231 are directed to a photo data cache 401 that is logically storage server 201/photo-cache. When user A 301 uses the username to access DApp client 233, reads and writes from DApp client 233 are not directed to the photo data cache. This configuration applies to other users with access to the storage server 201, with the specific configuration of DApps that can write to the user's data cache(s) depending on the user's associated DApps.

Write Access to Backend Storage

To allow an authorized DApp to read and write encrypted data on the backend storage, the user interface of the frontend client authenticates the user, and the frontend client then establishes a connection with the user's storage server. The storage server generates an access token, such as a JSON web token, that is is DApp-specific and gives the authorized DApp a right to write data to a specific location on the backend storage. The DApp stores the access token at a specified location, such as a data locker on the backend storage that is accessible by that DApp and not accessible by unauthorized DApps. Such data lockers are discussed later in this disclosure. In the future, when the DApp needs to read data from or write data to the backend storage via the storage server, the DApp passes the access token to the storage server, which can utilize the data in the token to authorize the DApp to read and write data on behalf of the frontend client's user. Stated another way, this token controls write access to the storage server and is created by the user interface of the frontend client when granting a DApp access to a data cache, and it can be stored in the DApp's own storage Data Caches The present description includes the inventive realization that data caches, controlled by users, provide a useful solution for storing data that is used by multiple DApps. Preferably, the data in the data cache are stored in a backend storage provider in a known location defined in and accessed through the storage server 201. This data is accessible to different DApps that a user has logged into, so long as the DApp is authorized to read and write from the data cache. To ensure that unauthorized DApps or other unauthorized entities cannot access the data, only authorized DApps are given encryption keys so the authorized DApps can encrypt and decrypt the data stored in this data cache.

Preferably all data in a data cache have a common format, such as contacts, photos, or documents. As an example, a user can have data cache for storing photos that can be brought to different photo DApps and messaging DApps. A user can have another data cache for storing documents that can be brought to different email DApps and word processing DApps. Having a common format can ensure that all DApps with access to a data cache can understand the data stored therein. Accordingly, in at least one embodiment, the format of the data in the data cache can be published either in a software library or at a known network location, such as a location on the web (e.g., github.com, a development platform for open source and enterprise projects). The library provides defined classes for commonly used data schemas, such as schemas available at schema.org, a repository of schemas for structured data on the Internet. Internally, this class would convert to the data format that all DApps can understand. When a DApp creates a new Contact, for example, the DApp can use the contact class and get a contact object. Preferably, these objects will automatically convert to the defined data schemas when stored to the backend storage via the storage server, and convert from the defined data schema to the objects when retrieved from the backend storage via the storage server.

An example of a contact schema can be based on, and preferably represents a subset of, the properties included in the "Person" schema currently available at https://schema.org/Person. The Person schema contains many properties. Not all properties need to be included in the corresponding contact class, which can advantageously simplify the class. If a DApp developer wishes to add a property of the Person schema to the class, the developer can do so without impacting other DApps using the class. Rather, the DApp developer can add a new field and attach an identifier or namespace to that field so that the DApp can read the field and write that to the storage server, while not impacting other DApps that are also trying to use the data in the data cache.

To prevent DApps from interfering with data caches with which they are not associated or otherwise not authorized to use, the data stored in a data cache can be encrypted based on a cache-specific private key. The cache-specific private key can be based in part on the DApp's name or other identifier. Recalling the prior example, when the data logically associated with storage server 201/photo-cache is encrypted based on the cache-specific private key, then DApp 233 cannot interfere with the data in storage server 201/photo-cache, because DApp 233 has no access to the cache-specific private key. More specifically, the storage server 201 executes computer-implemented instructions applying cryptographic authentication to enforce the requirement that an unauthorized DApp cannot interfere with a data cache. The cryptographic authentication can require 1) knowing how to derive the cache-specific private key; and 2) in the case of writes, also knowing a private key needed to sign an authentication token.

Data cache storage can be implemented a data-interchange format, such as JSON. In certain embodiments, however, rather than dealing directly with a data-interchange format, such as JSON, sets of classes can be created to represent the types of data stored in data caches, such as contacts, photos, and documents. These classes can internally convert between the objects and the data-interchange format implemented in other storage functions used by DApps. In such embodiments, each object will map to individual files in storage.

Functions that can be executed in conjunction with data caches, include, but are not limited to, saving an item in a data cache, retrieving a single item from a data cache using an ID previously associated with the data cache item when the item was originally saved to the data cache, listing items in a data cache, returning a count of items in a data cache, and deleting a data cache item. Preferably, deleting a data cache item does not remove from the item from backend storage. Rather, to guard against malicious or otherwise unintentional deleting, deleting a data cache item encompasses renaming the file as a historical file and updating an index file to reflect the renaming. This process of renaming a file and updating the index file to reflect the renaming can be applied generally to all changes to a file in the data cache. Storing a historical copy of the file advantageously provides a user with roll-back capability. The process of file renaming and updating an index file is akin to an event log and is described in greater detail below. Generally speaking, each data write by a DApp can be stored as a separate file. This ensures that data is never lost and the user can return files back to any previous state.

A user retains full control over cache data via the frontend client. DApps must request access to specific data caches during authentication. A user can manage DApp permissions for data caches through the user interface of the frontend client.

Decentralized Data Cache Problem

Again, a preferred embodiment of the platform allows data in a data cache to be encrypted and remain under the control of the user. But this presents a problem, because disparate DApp providers must have access to the encrypted data in the data cache while also allowing the user (and not a centralized server) to retain ultimate control. In a traditional centralized model, where the central server retains ultimate control, the central server has knowledge of any applications (apps) that users have signed into using the central server's authentication service, and the central server also controls of the write location. If an app writes bad or malicious data or deletes data in an unwanted manner, the central server can provide recovery services because the central server controls the data. When there is no central authority that has that view of the data, challenges arise in how to provide a user-controlled data cache. This disclosure provides a technical solution to the technical problem and provides for a data cache providing read and write access to DApps, which is revocable by the user.

In this regard, the frontend client 213 derives a cache-specific private key to allow authorized DApps to write to and read from the data cache. The cache-specific private key is used to create the credentials that give a DApp access to its associated data cache via the storage server 201. It is also used in the end-to-end encryption of files stored for that DApp in the user's data cache backend storage provider. And it serves as a cryptographic secret that the DApp can use to perform other cryptographic functions. The cache-specific private key is deterministic, meaning that the same cache-specific private key can be derived each time for a given user and cache identifier.

As discussed below, in embodiments of this disclosure, encrypted data is not exposed and the frontend client controls all encryption keys.

Storage Key Generation

Again, data can be stored in a user's data cache for use among multiple DApps, and without being tied to a specific DApp. A data cache on a backend storage provider 205-211 can be identified via an address on the storage server 201. For example, cache data can be stored in a cache (e.g., cache.contacts or collections.contacts) logically associated with a storage key/address (e.g., https://svr.example.com/143tnkzivFVgPqerPKUoKLdyvgyYNPjM9/) on the storage server 201 (e.g., https://svr.example.com/). The storage key/address 143tnkzivFVgPqerPKUoKLdyvgyYNPjM9, and addresses for other data caches, can be derived from a cache-specific node key for a user private key using a hash of the data cache name as the index.

Each user of the storage server 201 has a unique user private key based on, for example, an elliptic curve point. In at least one embodiment, the user private key is Base58 encoded. And preferably, a user private key has the property that there is no way to know or derive the user private key without already knowing it. Again, the user private key can be used as an input to a function that derives a new storage key/address using the user private key and a value based (at least in part) on an identifier unique to the data cache as inputs. Preferably, the derive function is a one-way function that hashes data such that the storage key has the property that there is no way to know the storage key without also knowing the data cache identifier. It is deterministic in that, for a given user and data cache identifier, the same storage key is generated each time.

Figures 5, 6:
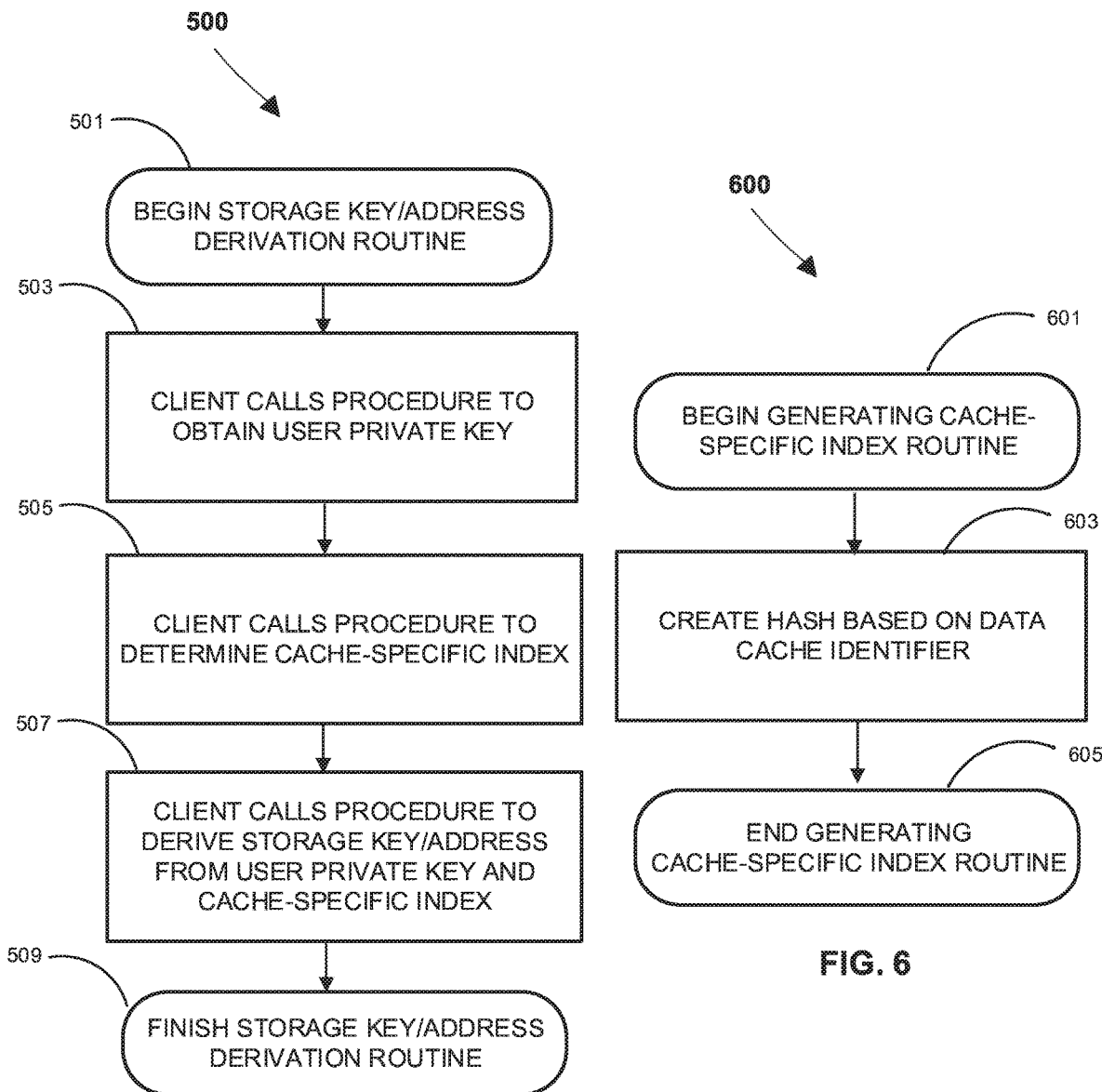
FIG. 5 provides a routine for returning a storage key/address for a backend storage provider by a client computer in a decentralized network.
FIG. 6 provides a routine for generating a data cache-specific index for use in determining the storage key/address.

FIG. 5 illustrates a process 500 for deriving the storage key/address based on the user private key and the data cache identifier unique to the data cache, such as the data cache name. An example implementation for deriving the storage key/address implements a hierarchal deterministic key creation and transfer protocol that allows creating child keys from parent keys in a hierarchy, such as BIP32. The process begins in element 501. In element 503, the frontend client calls a procedure to obtain the user private key. In element 505, the client calls a procedure to determine a cache-specific index based on the data cache identifier. In element 507, the client calls a procedure to derive the storage key/address as a child key of the user private key, using the cache-specific identifier as the index.

FIG. 6 shows an example implementation 600 of element 505. The process begins in element 601. In element 601, the frontend client creates a hash based at least on an identifier for the data cache. The identifier can be a name of the cache, such as "cache.contacts" or "collections.contacts." The hash can also be based on a salt (data that is used as an additional input). The salt can be secret or non-secret, depending on the implementation. The salt can be based, for example, on the user's username and/or address used to login to the frontend client or other secret or non-secret information. The data cache identifier and the salt, if included, are input to a hash function. An example hash function can include the SHA-256 algorithm. The output of hash (hereinafter, the "hash") can be, for example, hexadecimal value. The process ends at element 605.

In at least one embodiment, the child key, such as a hardened child key, is derived based on the Base58 representation of the user private key and the foregoing hash as the index. The cache-specific child key can be returned as the output of the child key derivation or, for example, a subset of that returned value, such as a slice or substring of a pre-defined length. A desired format of the cache-specific child key, that is, the storage key/address, consists of characters suitable for entry in a web browser URL, such as capital and lowercase letters and numbers.

The user's profile data can be stored, for example, on the storage server or the backend storage accessed via the storage server in a file format such as a json format. When a user authorizes a DApp to access the data cache for the first time, information about the data cache and the authorized DApp can be added to the user's profile data. Example 1 provides a non-limiting example of information about the data cache and DApps that can be stored in the user's profile data. Example 1 provides information about a data cache storing documents, and DApps authorized to access that data cache, including an identifier of the storage server 201, such as the name/address; the cache-specific child key (storage key/address); and the identifiers of the authorized DApps, such as the names/addresses.

```
 cache: {
    "documents": {
       "location":  "https://svr.example.com/1Lsdf83isMHFs
          fse223hrbEynNR63vn2A/",
       "authorizedDApps":
       //Encrypted section
       [
          "https://myDApp.com",
          "https://otherDApp.com"
       ]
       //End encrypted section
    }
 }
```

EXAMPLE 1

The foregoing processes creates a unique address where all authorized DApps can write (see the "location" of Example 1) documents sharing a common format.

As discussed above, certain embodiments include the inventive realization that, if authorization is revoked, the unauthorized DApp should not be able to read and write data stored at the unique address, irrespective of whether the unauthorized DApp still has knowledge of the unique address. The processes described below for encryption key generation provide a system and method for preventing an unauthorized DApp from reading and writing to the unique address generated with the storage key generation processes.
Encryption Key Generation DApps authorized to access a data cache can be given an encryption key that is derived from the user's master private key. An encryption key represents a derived cache-specific private key used to encrypt and decrypt data in a data cache. The encryption key can be the same for any DApp that wants to use the data cache. The index for deriving the encryption key can be based on a hash of a list of identifiers of DApps (such as a list of DApp names) authorized to access the data cache. Alternatively, the index for deriving the encryption key can be based on an integer index, such as an incrementing index. Certain embodiments include the inventive realization that, with this configuration, encryption keys can be revoked by removing a DApp from the authorized list or by incrementing the integer. When a user wants to revoke a DApp's access to a data cache, the encryption key changes, as discussed in greater detail below.

FIG. 7 illustrates a process 700 for deriving a cache-specific encryption key that is based on the user's (top-level or master) private key and a list of authorized DApp identifiers. The process begins in element 701. As shown in element 703, the frontend client receives an identifier uniquely identifying the data cache. Continuing the previous example, an identifier can be a data cache name, such as "cache.contacts". In element 705, the frontend client receives a list of identifiers of DApps authorized to access the data cache. For example, a list could consist of DApp names, such as "https://myDApp.com" and "https://otherDApp.com". In element 707, the frontend client creates a first hash based at least on the list of authorized DApps using a hash algorithm, such as SHA-256. In element 709, the frontend client creates a second hash based at least on the data cache identifier and the first hash. The second hash can also be based on a salt. The salt can be secret or non-secret, depending on the implementation. In element 711, a cache-specific encryption key, such as a hardened child key, is derived based on the user private key and the second hash. The process ends in element 713.

FIG. 8 illustrates another process 800 for deriving a cache-specific private key that is instead based on the user's private key and an incrementing index. The process being in element 801. Again, as shown in element 803, the frontend client receives an identifier uniquely identifying the data cache, such as "cache.contacts". In element 805, the frontend client receives a value, such as an integer. The integer value can be an incrementing index value that is different from any previous index previously used to derive the cache-specific private key. In element 807, the frontend client creates a hash (similar to the second hash discussed in the context of FIG. 7) based at least on the data cache identifier and the integer index. The hash can also be based on a salt. Again, the salt can be secret or non-secret, depending on the implementation. In element 809, a cache-specific encryption key, such as a hardened child key, is derived based on the user private key and the hash. The process ends in element 811.

Advantageously, the foregoing processes for determining the encryption key can be performed by the frontend client, which has access to the user's private key. With such a configuration, the user's private keys are not exposed to DApps or the storage server. When the frontend client generates the encryption key, the user interface of the frontend client can direct the storage server to store an encryption key identifier associated with the encryption key, such as a hash of the encryption key, in the backend storage where the data cache data is stored. The frontend client can also direct the storage server to store the encryption key in an encrypted form in an application-specific data locker associated with each authorized DApp, as discussed below.

As discussed below, a DApp client associated with an authorized DApp can also locally store the encryption key identifier (an encryption key ID) associated with a generated encryption key, e.g., with the DApp client machine rather than in the backend storage. When the encryption key changes (e.g., because a DApp is added to or removed from the list of authorized DApps), any unauthorized DApp will no longer be able to access the data cache associated with the encryption key.

Encryption Key Storage

The storage server can store an identifier of the encryption key, such as a hash of the encryption key, in the data cache. The user interface of the frontend client can initiate such storage when the data cache is created and whenever the encryption key is updated (e.g., when a new DApp is authorized to access the data cache or when access by a DApp is revoked by the user). In addition, for each DApp authorized to access the data cache, the cache-specific encryption key can be encrypted with a DApp-specific private key and stored in a DApp-specific data locker on the user's backend storage provider. A DApp-specific private key is different from a cache-specific encryption key. A DApp-specific private key can be used to encrypt and decrypt data and is known only to the frontend client and the DApp associated with that DApp-specific private key. A DApp-specific private key is typically associated with a data locker (discussed below). A cache-specific encryption key can be used to encrypt and decrypt data, but it is known to the frontend client and all authorized DApps authorized for the data cache by the user. A cache-specific encryption key is typically associated with a data cache.

Data locker is a broad term and includes a location on a backend storage provider, such as a directory or partition or logical or virtual storage, capable of storing data. A data locker is structurally/logically analogous to a data cache, but the DApps that can access a data locker are different. Multiple authorized DApps can access a user's data cache. But a data locker is specific to a user and a DApp. A description of DApp-specific private keys and DApp-specific data lockers and systems and methods for generating DApp-specific private keys for data lockers is provided in U.S. patent application Ser. No. 16/555,632 (entitled MIGRATING DATA FOR DECENTRALIZED APPLICATIONS BETWEEN DISPARATE BACKEND STORAGE PROVIDERS) and U.S. patent application Ser. No. 16/555,541 (entitled BACKUP OF ENCRYPTED INFORMATION STORED OFF-CHAIN IN A BLOCKCHAIN-BASED DECENTRALIZED STORAGE SYSTEM), both filed on Aug. 29, 2019, the disclosures of which are incorporated by reference in their entirety as if set forth herein. The DApp can then retrieve the encryption key from the DApp-specific data locker and cache it locally, for example, in the local storage for a web browser used to run the DApp.

On encrypted write operations, the DApp will send its copy of the encryption key identifier (e.g., a hash of the locally stored encryption key) to the storage server as part of the write request. The storage server can compare the encryption key identifier storage in the data cache against the encryption key identifier sent by the DApp to determine if the identifier matches. The storage server can reject the write request in case of a mismatch. In certain embodiments, the DApp can take appropriate action to update its cached encryption key from the DApp-specific data locker and retry the write request. In this way, the storage server does not need to know or derive the encryption keys to determine that a DApp's encryption key is up-to-date (and therefore authorized to access the data cache). Furthermore, certain embodiments include the inventive realization that, with this approach, if and when the encryption key changes, no action is required from an authorized DApp to continue to decrypt the data.

Again, this check ensures that the encryption key is correct and up-to-date. Write access to the storage server (and on to the backend storage) is granted via a separate mechanism, however, namely, the access token described above. Again, this access token is created by the user interface of the frontend client when granting data cache access to DApp, and it is stored in the DApp's DApp-specific data locker. The access token preferable is included in every write request from the DApp.

As discussed above, when the user is authenticated by the user interface of the frontend client, the frontend client (as discussed above) connects to the storage server and generates an access token for an authorized DApp. This access token is DApp-specific and gives the DApp a right to write data to a specific data cache. This access token is passed back to the DApp, and that DApp keeps it in local storage so that it can continue to store and read data from this data cache. Going forward, on encrypted write operations, the DApp will send the encryption key identifier as part of the write request. The storage server checks if the identifier matches and rejects the request if there is a mismatch.

Consistent with the foregoing description of storing the encryption key in a DApp-specific data locker, the encryption key can be stored in an encryption key file. The file name can follow a pre-defined naming convention, such as photos.cache.key or documents.cache.key. Each data cache can be associated with a distinct (cache-specific) encryption key file. The filenames are desirably encrypted. By way of example, a backend storage provider including two data caches (Photos and Documents) and two Dapp-Specific data lockers for DApp1 and DApp2 can be conceptualized according to the following example. In this example, DApp1 is associated with both data caches, and DApp2 is only associated with the Photos data cache.

Photos
Documents
DApp1
. . .
Photos.cache.key
Documents.cache.key
. . .
DApp2
. . .
Photos.cache.key
. . .

EXAMPLE 2

Encryption Key Revocation

Again, when a user wants to revoke a DApp's access to a data cache, the user needs to change the cache-specific encryption key that was written to each DApp's Dapp-specific data locker and encrypted. When the user revokes access to that DApp, the user needs to let all the other DApps (the still-authorized DApps) that all have this cache-specific encryption key know that the cache-specific encryption key has now changed. To revoke a DApp's ability to encrypt and decrypt data in a data cache, the frontend client can change the cache-specific encryption key and initiate a process to re-encrypt the existing data. The foregoing procedures are executed with the frontend client because the frontend client can write data to every DApp's data locker as well as all data caches. For example, a graphical user interface or browser of the frontend client, which holds the user's (top-level or master) private key, can write a new cache-specific encryption key to each of the DApp-specific data lockers for all the DApps that use this data cache (without writing the new cache-specific encryption key to the DApp-specific data locker for the DApp whose access was revoked).

The encryption key can be changed by the frontend client executing a procedure to open the profile data stored on the storage server or backend storage and delete from the authorized DApp list in the profile data a DApp previously associated with that data cache. The procedure can be executed, for example, when a user revokes authorization for that DApp to access the data cache or chooses not to associate with the DApp any longer. In this regard, the process described above for encryption key generation can be repeated, applying the new list of DApps that do not include the removed DApp. As the first hash is based on the list of all the authorized DApps, when the first hash changes (because it no longer includes the removed DApp), the cache-specific private key also changes.

The user interface of the frontend client can display to the user an option to decrypt and re-encrypt all files in the data cache, including previously created files and historical file writes, using a new encryption key. The user interface can be configured to display an option to encrypt new file writes using the newly generated key, while historical files would not be re-encrypted. The new encryption key can be stored in the user profile following the procedures described above for encryption key storage. In certain embodiments, a legacy encryption key can be maintained in the user profile if a DApp requires access to historical data that has not been re-encrypted with the new encryption key.

When an authorized DApp sends a write operation, the DApp sends the encryption key ID to the storage server. The storage server checks the encryption key ID against the stored key file in the data lockers and return an error to the frontend client in the case of mismatch. DApp client-side logic would fetch the encryption key from the DApp-specific data locker, decrypt, and attempt perform the write again with an updated encryption key ID based on fetched encryption key.

Example Implementation of Storage and/or Revocation

Figure 9:
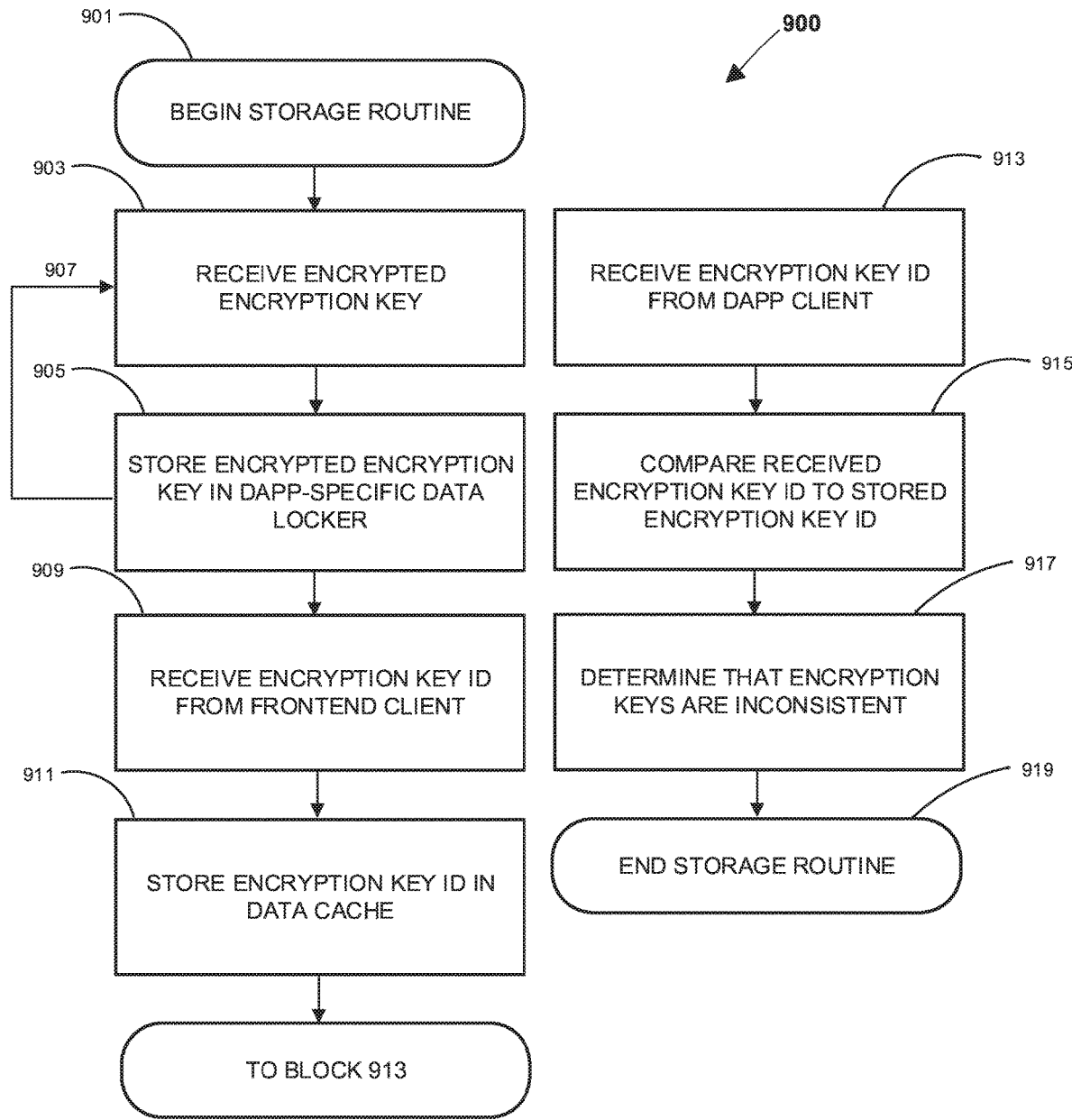
FIG. 9 provides a storage routine for storing data in a data cache that is accessible by multiple decentralized applications.

Consistent with the foregoing description, a process 900 for storing encrypted data outside of the blockchain of the blockchain-based network is shown in FIG. 9. The process begins in element 901. In element 903, the storage server receives from the frontend client an encryption key encrypted with a DApp-specific private key. In element 905, the storage server stores the encrypted encryption key in the DApp-specific data locker associated with that DApp. Elements 903 and 905 repeat in loop 907 for all DApps authorized to access a data cache. In element 909, the storage server receives from the frontend client, an encryption key identifier associated with the underlying encryption key. Note that all DApps-specific data lockers receive the same encryption key, encrypted differently by the frontend client with the DApp-specific private keys. The encryption key generation and encryption was incorporated by reference above. In element 911, the storage server receives from the frontend client a first encryption key ID identifying the underlying encryption key. In element 913, the storage server directs the storage provider to store the encryption key ID in the data cache. The storage server can transmit the encryption key ID to all DApp clients authorized to access the data cache.

In element 913, the storage server receives an encryption key ID from a DApp client (that may or may not be an authorized DApp), as part of a write request, for example. In element 915, the storage server compares the received encryption key ID and the stored encryption key ID. In element 917, the storage server determines that the encryption keys are inconsistent and transmits to the DApp client a message indicating that the access request is denied. The DApp client can request that the storage server retrieve and return from the DApp's DApp-specific data locker the encrypted encryption key. The DApp-client can retry the write process after receiving the encrypted encryption key, which the DApp-client can decrypt with the DApp-specific private key. Note that an unauthorized DApp will not be able to write to the data cache, even if it has knowledge of the data cache address, because its DApp-specific data locker does not have the newest copy of the encrypted encryption key on which the encryption key ID is based. The process ends in element 919. Note that, in the case of permission revocation, the revoked DApp's access token to the data cache will also have been expired by the user. Therefore, write access by the unauthorized DApp would be effectively disabled through this mechanism.

Storage Server Changes and Data Recovery

The storage server can allow for an inventive authentication token that only supports a special write operation that retains change history. An authentication token is a digital transmission comprising a payload containing data sufficient to ensure a DApp has the authorization to write to a data locker (via the storage server) on a user's behalf. Certain embodiments include the realization that the inventive authentication token provides the user with the ability to roll back files to a previous state. In at least one embodiment, every historical file is retained in a data cache data locker. As shown in Example 3, below, the newest version of the file can be stored with a canonical name so that file reads do not need to query an index or log. In this example, the naming scheme follows the format ".history.<timestamp>.<guid>.<filename>". Timestamp can be, for example, a number such as 1565527096 corresponding to when the file was named. Guid can be a randomly generated identifier that prevents concurrent writes from overwriting the same file.

photo.png //Newest version
        .history.[timestamp3].[guid3].photo.png //Previous version
        .history.[timestamp2].[guid2].photo.png
        .history.[timestamp1].[guid1].photo.png

EXAMPLE 3

In this embodiment, on file writes, before updating the file, the storage server renames the previous version of the file to the historical file naming scheme. The naming scheme includes an incrementing number to allow for file ordering. An optional index file associated with the data cache data locker (described below) can provide the current maximum number for each file. The storage server can be configured to deny writes to files that follow the historical file naming scheme so that DApps cannot overwrite historical files. Rather, the historical file naming can be an atomic operation executed by the storage server, outside of the control of DApps. If the user wants to roll back a file, the full history of each file can be reconstructed using the historical files and the number in the filename. It should be emphasized that the index file is optional. For example, an implementation using a historical naming convention with a "timestamp" and "guid" identifier obviates the need for an index file.

The storage server can update the index file automatically (that is, once initiated, the function is performed by the storage server, without the need for manually performing the function). The index file can contain a list of all files stored in the data cache and the current value of the incrementing number for each file. On each file write, the storage server can read the index file. The storage server can add a new entry if the file does not exist. If the file already exists, the storage server can increment the number.

Figure 10:
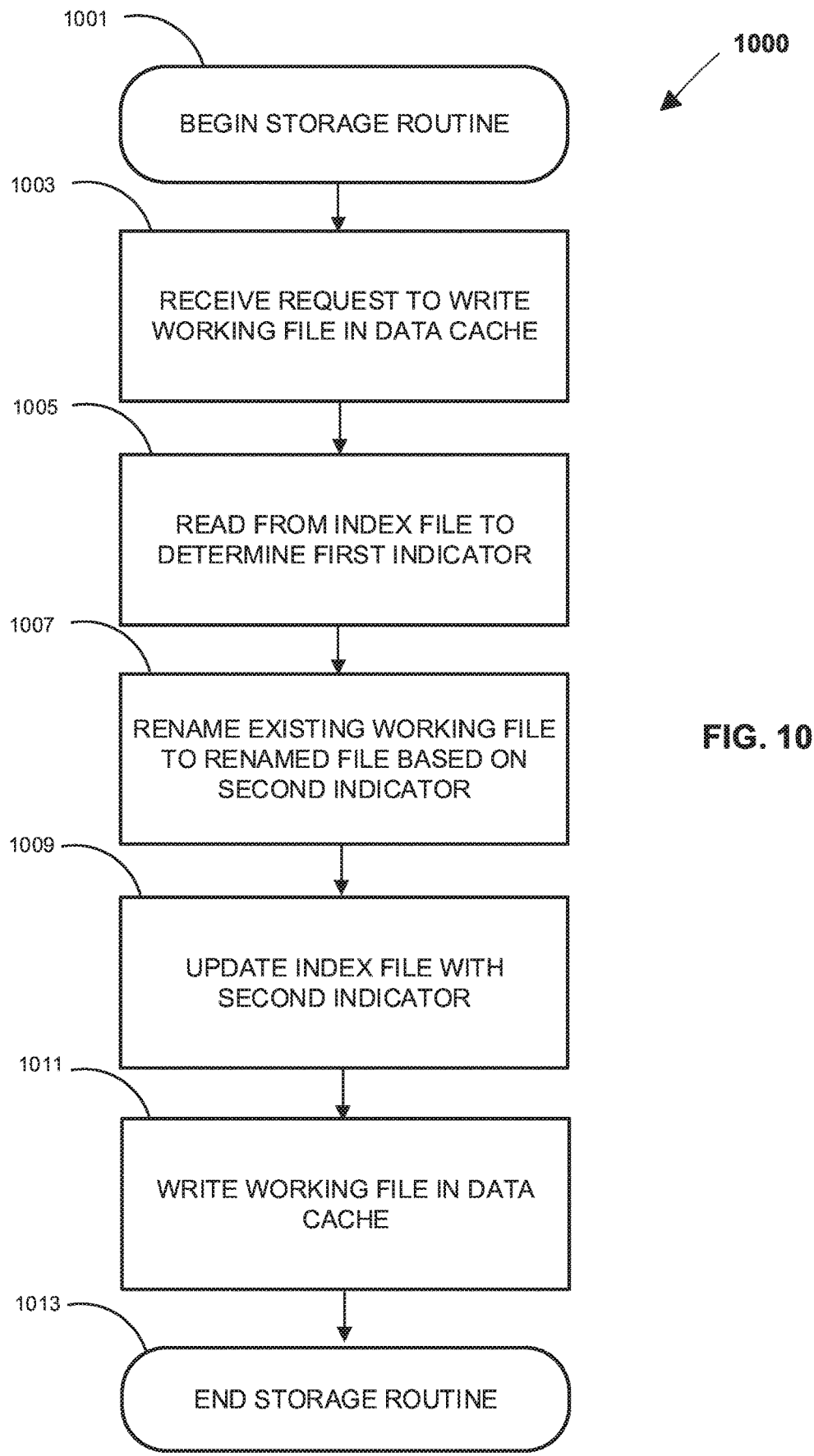
FIG. 10 provides another storage routine for storing data in a data cache that is accessible by multiple decentralized applications.

Consistent with the foregoing description, a process 1000 for storing encrypted data outside of the blockchain of the blockchain-based network is shown in FIG. 10. The process begins in element 1001. In element 1003, the storage server receives from a DApp client, a request to write a working file in the data cache for a DApp. Note that the request can also include an access token and/or an encryption key ID and/or a private key identifier. In element 1005, the storage server reads from an index file to determine a first indicator previously associated with the working file. In element 1007, the storage server renames and thereby stores the working file to a renamed file, based on a second indicator that is different from the first indicator. In element 1009, the storage server updates the index file with the second indicator. In element 1011, the storage server causes the storage provider to write the working file in the data cache. The process ends in element 1013. If the storage server receives a request to write to the renamed file on the storage provider by another DApp (such as a malicious DApp), the request is denied.

This disclosure provides an inventive approach for recovering data stored off-chain in a data cache in a blockchain-based network. Because the user gives different DApps access to write data to a data cache, and the DApps are controlled by independent entities, it is possible that one of these DApps can be faulty or malicious. A faulty or malicious DApp could overwrite data, delete data, or otherwise act on the data in a way that contravenes the user's wishes. The historical file naming allows users to recover data, such that, even if one of the DApps were faulty or malicious and somehow corrupted or deleted data, the user can revert to a historical version of the file before the unwanted write or deletion. With the foregoing approach, a DApp does not overwrite the previous version of the data, which is stored as a historical file. DApps do not have the ability to overwrite these historical files. To recover the data, the user could open a file browser or explorer and review the history of individual files and revert to the desired version.

System Structure

The system structure can be configured with backend storage providers interacting with frontend applications and storage server providing an interface between the backend storage providers and the frontend applications. As discussed above, these backend storage providers can be any cloud storage, local storage, or network storage provider. A preferred, but non-limiting, embodiment of the storage server is the Gaia™ decentralized storage system (Blockstack PBC, New York, N.Y., USA). The storage server does not have been in the same physical or logical location as the backend storage provider(s), but it could be. The storage server could be running locally. Regarding the frontend client(s), suitable frontend applications include command line interfaces and decentralized web browsers, such as Blockstack CLI and Blockstack Browser (Blockstack PBC, New York, N.Y., USA).

Functions for received and deriving cryptographic keys can be executed at the frontend. Therefore, the frontend client is responsible for receiving the user's private key and deriving the cache-specific private keys. With this configuration, only the user's client application is exposed to private keys. The frontend applications also can perform the iterative steps for deriving each cache-specific private key. The storage server exposes interfaces for reading from and writing to the backend storage providers when DApps unlock the data caches for reading and/or writing. The appropriate backend storage providers respond to these interfaces.

Again, data is stored in whichever backend storage provider the storage server is configured to store them in.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. In a blockchain-based network, a storage server configured to communicate with a storage provider configured to store encrypted data for a plurality of decentralized applications outside of the blockchain of the blockchain-based network, the storage server comprising:
   one or more network interfaces configured to couple the storage server to the storage provider and to an application client authorized to write data on behalf of a user client;
   a hardware processor;
   a first non-transitory computer readable storage medium configured to store resource identifiers corresponding to resources on the storage provider, the resources comprising a data cache configured to store shared data having a common data type off-chain from the blockchain, the data cache configured to store the shared data for authorized decentralized applications of the plurality of decentralized applications; and
   a second non-transitory computer readable storage medium configured to store program instructions for execution by the hardware processor in order to cause the storage server to:
      receive, from the application client, an access token and a first request to write a working file in the data cache by a first requesting decentralized application of the authorized decentralized applications,
      read from an index file stored in a file format to determine a first indicator previously associated with the working file, rename the working file to a renamed file based on a second indicator that is different from the first indicator, such that the renamed file is stored on the storage provider, update the index file with the second indicator, deny a second request to write to the renamed file on the storage provider by a second decentralized application of the authorized decentralized applications, and write the working file in the data cache.

2. The storage server of claim 1, wherein the renamed filed comprises an alphanumeric indicator that indicates the renamed file is a historical file.

3. The storage server of claim 1, wherein the first indicator is a numeric indicator.

4. The storage server of claim 1, wherein the second indicator is a numeric indicator.

5. The storage server of claim 4, wherein the first indicator and the second indictor are sequential.

6. The storage server of claim 1, wherein the access token is a JavaScript Object Notation (JSON) web token.

7. The storage device of claim 1, wherein the index file retains the first indicator.

8. The storage device of claim 1, wherein the index file is stored in the data cache.

9. A computer-implemented method comprising:

under the control of a storage server that is configured to store resource identifiers corresponding to resources on a storage provider that stores encrypted data outside of the blockchain of the blockchain-based network, the resources comprising a data cache configured to store shared data off-chain from the blockchain, the data cache configured to store the shared data for authorized decentralized applications of the plurality of decentralized applications, receiving, from an application client, a request to write a working file in the data cache by a requesting decentralized application of the authorized decentralized applications;

reading from an index file stored in a file format to determine a first indicator previously associated with the working file;

storing, on the storage provider, a renamed file based on the working file, with a file name comprising a second indicator that is different from the first indicator;

updating the index file with the second indicator; and writing the working file in the data cache.

10. The method of claim 9, wherein the renamed file is stored in the data cache.

11. The method of claim 9, wherein the renamed filed comprises an alphanumeric indicator that indicates the renamed file is a historical file.

12. The method of claim 9, wherein the first indicator and the second indictor are sequential.

13. The method of claim 9, wherein contents of the working file are encrypted with an encryption key known to the requesting decentralized application and not known to the storage server, and a file name of the working file is not encrypted.

14. A non-transitory, computer-readable storage medium comprising computer-executable instructions for managing encrypted data in a data cache off-chain from a blockchain on a storage provider with a storage server that locally stores no encryption keys for encrypting the encrypted data, wherein the computer-executable instructions, when executed by a computer system, cause the storage server to:

receive, from an application client, an access token, an encryption key identifier, and a first request to write a working file in the data cache by a first requesting decentralized application of the authorized decentralized applications, wherein contents of the working file are previously encrypted with the unencrypted encryption key, which is known to the requesting decentralized application and not known to the storage server, and a file name of the working file is not encrypted;

read from an index file, stored in a file format, to determine a first indicator previously associated with the working file;

rename the working file to a renamed file based on a second indicator that is different from the first indicator;

cause the renamed file to be stored on the storage provider;

update the index file with the second indicator;

cause the working file, previously encrypted with the encryption key, to be written to the data cache; and deny a second request to write to the renamed file on the storage provider by a second decentralized application of the authorized decentralized applications.

15. The non-transitory, computer readable storage medium of claim 14, wherein the renamed file comprises an alphanumeric indicator that indicates the renamed file is a historical file.

16. The non-transitory, computer readable storage medium of claim 14, wherein the second indicator is a numeric indicator.

17. The non-transitory, computer readable storage medium of claim 16, wherein the first indicator and the second indictor are sequential.

18. The non-transitory, computer readable storage medium of claim 14, wherein the access token is a JavaScript Object Notation (JSON) web token.

19. The non-transitory, computer readable storage medium of claim 14, wherein the index file retains the first indicator.

20. The non-transitory, computer readable storage medium of claim 14, wherein the renamed file is stored in the data cache.

* * * * *